(12) United States Patent
Sharman

(10) Patent No.: US 6,977,662 B2
(45) Date of Patent: Dec. 20, 2005

(54) CORRECTION OF DIGITAL IMAGES

(75) Inventor: Richard A. Sharman, Dunstable (GB)

(73) Assignee: Eastman Kodak Company, Rochester, NY (US)

( * ) Notice: Subject to any disclaimer, the term of this patent is extended or adjusted under 35 U.S.C. 154(b) by 105 days.

(21) Appl. No.: 10/106,778

(22) Filed: Mar. 26, 2002

(65) Prior Publication Data

US 2002/0171661 A1    Nov. 21, 2002

(30) Foreign Application Priority Data

Apr. 26, 2001  (GB) .................................. 0110240

(51) Int. Cl.⁷ ............................................. G09G 5/02
(52) U.S. Cl. .................... 345/589; 345/581; 345/593; 345/597; 345/591
(58) Field of Search ............... 345/581, 589, 345/593, 597, 591

(56) References Cited

U.S. PATENT DOCUMENTS

| | | | |
|---|---|---|---|
| 4,812,902 A | | 3/1989 | Fuchsberger |
| 4,812,903 A | * | 3/1989 | Wagensonner et al. ..... 358/521 |
| 4,908,701 A | | 3/1990 | Udagawa |
| 5,450,217 A | | 9/1995 | Eschbach et al. |
| 5,990,950 A | * | 11/1999 | Addison ..................... 348/273 |
| 6,018,588 A | | 1/2000 | Kim |

FOREIGN PATENT DOCUMENTS

EP          0648040         10/1994

\* cited by examiner

*Primary Examiner*—Matthew C. Bella
*Assistant Examiner*—Tam Tran
(74) *Attorney, Agent, or Firm*—Frank Pincelli

(57) ABSTRACT

A method of processing digital images which gradually substitutes a processed and/or filtered version of the input data for the original data. The method is applied to shadow regions of a color digital image to remove residual dark area color casts.

9 Claims, 1 Drawing Sheet

CORRECTION OF DIGITAL IMAGES

CROSS REFERENCE TO RELATED APPLICATIONS

This is a U.S. original patent application which claims priority on Great Britain patent application No. 0110240.9 filed Apr. 26, 2001.

FIELD OF THE INVENTION

This invention relates to the manipulation of digital images, in particular to the manipulation of areas of shadow.

BACKGROUND OF THE INVENTION

The proportion of digital images requiring printing or display is growing with the increasing use of digital images in the home, office and on the internet. The originating equipment is typically a digital camera or scanner. In the case of a digital camera, the scene illumination may be less than ideal, or there could be high levels of noise in the camera image file that results in noisy and/or colored shadows in the final image. In the case of a print scanner color cast in the original print could give unacceptable colored shadows in the scanned version of the print. Even if the originating equipment provides an accurate 'well balanced' image any subsequent processing may introduce color casts or noise.

U.S. Pat. No. 4,160,264 provides a matrixing method to correct for color casts in shadows. However this document provides no method for automatically modifying the point at which the matrixing takes effect for a wide range of images such as under exposed and back lit. Nor does U.S. Pat. No. 4,160,264 provide any additional means to reduce the noise levels in the dark areas of the picture.

There are a number of 'fixing' algorithms that attempt to correct for poor quality images, such as 'Auto-levels' in Adobe Photo-shop and HP patent U.S. Pat. No. 5,812,286 that pins the 'black' and 'white' point of each color. These processes generally affect the whole image in order to correct for the errors in the shadow color. Computers are also increasingly using color management and printer profiles to improve the rendition of printed images, but they cannot take into account color cast errors in the original image data.

Digital images, from digital cameras, scanners or any other suitable source can have dark color shadow regions. The invention aims to take any digital image and correct it for color casts or excessive noise in the shadow or dark areas of the image.

SUMMARY OF THE INVENTION

The invention operates in the shadow regions of a color digital image to remove any residual dark area color casts. The invention operates on a pixel-by-pixel basis and gradually substitutes a processed and/or filtered version of the input data for the original data. The processed data may be a simple averaging or filtering of the input channels, a matrix operation, or a combination of the two. The invention comprises two main sections, the generation of a number of processed and/or filtered versions of the input data and a decision making algorithm.

According to the present invention there is provided a method of manipulating color images in areas of shadow comprising the steps of generating a luminance version of the original color input data, determining a mean value of the input data, determining a chroma level, calculating an adaptive chrominance threshold from a predetermined chrominance input threshold and the determined mean value, and replacing, in an output image, a proportion of the input data with the luminance version of the data, the proportion of the input data being replaced being determined from the adaptive chrominance threshold and the chroma level. In a preferred embodiment the original color input data is pre-processed by replacing a proportion of the original color input data with filtered color input data, the proportion of the original color input data being replaced being determined by a predetermined luminance input threshold, the pre-processed data forming the input data used as described above.

Preferably the adaptive thresholds are calculated by multiplying the user set thresholds by the mean luminance level of the image.

The invention improves the appearance of the image by neutralizing the areas of shadow and reducing noise in the dark areas. By using adaptive thresholds to determine at what point the original data is replaced by processed data images with a wide range of mean levels can be automatically modified, including under exposed and back lit images.

BRIEF DESCRIPTION OF THE DRAWINGS

The invention will now be described, by way of example, with reference to the accompanying drawings, in which.

DETAILED DESCRIPTION OF THE INVENTION

Figure 1:
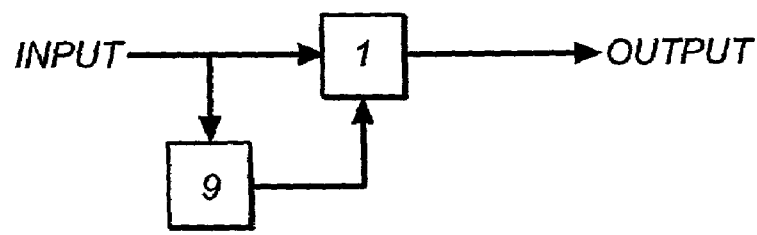
FIG. 1 is a block diagram showing an overview of the method of the invention.

FIG. 1 is a diagram showing the outline of the invention.

Original image data from the red, green and blue channels of an original image are input into box 1 and box 9. The input image data may be from any suitable source, such as a digital camera, scanner or such like. Various parameters are determined from the original data. These parameters are explained in more detail below.

The input data is processed and/or filtered in box 1 on a pixel by pixel basis. Threshold values are determined, in part, from the original data input into box 9. These values are output from box 9 and fed into box 1. The input data is compared to these threshold values. The choice of whether or not the processed data is substituted for the original data in the output image depends on the level of input data with respect to the determined threshold values. The final output provides a processed image in which the noise levels in dark areas and color casts to the shadow areas of the original image have been reduced.

The method of the invention will now be explained in more detail.

As stated above the invention comprises two main sections, the generation of a number of processed and/or filtered versions of the input data and a decision making algorithm.

By way of an example the stages are:

(1) Generate a low pass filtered version of the input data
(2) Generate an equal weighted luminance.
(3) Low pass filter the luminance data (an optional step)
(4) Measure the mean level of the luminance (5) Calculate the thresholds.
(6) Generate a chroma level signal
(7) Carry out the decision making algorithm
An example algorithm could be:

1—gradually substitute low pass filtered color, for the original color, in the case where the input data are below the luminance threshold; but not below the color threshold e.g. dark colors.

2—gradually substitute low pass filtered luma for original data, in the case where the input data are below both the luminance and color thresholds. e.g. near neutral dark colors.

As stated above, the processed version of the input data could comprise filtered versions of the input data and an equal weight, low pass filtered luminance version of the input data.

The red, green and blue channels are filtered by a low pass filter, typically, a circularly symmetric Gaussian filter although other filter types may equally be used. The coefficients of the Gaussian filter may be derived by the following formula, equation 1, which is well known in the art. $G_{(x,y)}$ is the filtered pixel (x,y).

$$G_{(x,y)} = (1/\text{sigma sqrt}(2\pi))(\exp[-(x^2+y^2)/(2\text{ sigma}^2)]) \quad (1)$$

1 3 1

Typically for a sigma of 0.7 a 3×3 filter is 3 8 3

1 3 1

The color channels are added together to give a luminance channel, typically of equal weight, as shown in equation 2, but other weightings of the channels could be used, as used in television for example.

$$\text{Luminance}=(\text{Red}+\text{Green}+\text{Blue})/3 \quad (2)$$

The luminance could use either the input channels with separate filtration or the already filtered versions of the input channels. Optionally, the luminance could also be additionally low pass filtered using the same Gaussian filter as above, although equally other filter types and band widths may be used.

In order to be able to operate satisfactorily over a wide range of image types pre-set thresholds, e.g. luma threshold$_{in}$ and chroma threshold$_{in}$, can be modified in accordance with the original image data to give an adaptive variable. In the preferred embodiment of the invention the pre-set thresholds are modified in accordance with the mean level of the luminance, the luma mean level. Typically this is determined from the luminance channel. However a similar adaptive variable could be derived from the original input data or any other derived channel, e.g. the mean level of one color only.

Typically the luma mean level is used to calculate the adaptive variables, Luma threshold$_{out}$ and Chroma threshold$_{out}$, using the following equations:

$$\text{Luma threshold}_{out}=\text{luma threshold}_{in}\times\text{luma mean level} \quad (3)$$

$$\text{Chroma threshold}_{out}=\text{chroma threshold}_{in}\times\text{luma mean level} \quad (4)$$

Luma threshold$_{in}$ and Chroma threshold$_{in}$ are predetermined experimentally and are user set values. These values are generally normalized to be any value between 0 and 1. An upper limit can be set for the output threshold if required, dependent on image type.

The Chroma Level, CL, of the input data is calculated by adding the absolute differences between each color channel and the luminance, given by:

$$CL=(|\text{Luminance}-\text{Red}|+|\text{Luminance}-\text{Green}|+|\text{Luminance}-\text{Blue}|) \quad (5)$$

The channels used are preferably those generated in equations 1 and 2 above, but other derivations could be used to give a bias towards certain colors.

The ratio of original data to processed data for pixel (x,y) is given by two factors, Lum_$F_{(x,y)}$ for luminance and Chrom_$F_{(x,y)}$ for chrominance.

$$\text{Lum\_}F_{(x,y)}=(\text{Luma threshold}_{out}-\text{Lum}_{(x,y)})/(\text{Luma threshold}_{out}\times\text{Onset}) \quad (6)$$

$$\text{Chrom\_}F_{(x,y)}=(\text{Chroma threshold}_{out}-CL_{(x,y)})/(\text{chroma threshold}_{out}\times\text{Onset}) \quad (7)$$

The range of levels over which the gradual substitution of input data for processed data takes place, is set by the 'Onset' parameter. If the 'Onset' value is '1' then complete substitution of the original data by processed data will only occur when the input data drops to '0'. Only then will the luminance and chrominance factors be equal to '1'. If the 'Onset' value is set to 0.5, then the complete substitution will occur when the input luminance and chroma levels are half the threshold values. In this case, when the input luminance and chroma levels are between half the threshold values and zero, the luminance and chrominance factors should be limited to 1 for correct operation of the invention. The 'Onset' parameter used is determined by previous experimentation.

The decision making process of the algorithm makes use of user set, preset or calculated parameters for the luminance and chrominance thresholds and the onset rate. The choice of which version of the processed and/or filtered input data is used will depend on the level of the input data, with respect to the thresholds, as calculated by equations 3 and 4 above, and whatever algorithm has been designed into the decision making process.

An example combining these two steps is given in the following two stage equation: Initially, as the input data drops below the luminance threshold, the original data, Orig, is substituted by the filtered version of the input data, filtered col.

$$\text{Stage 1 Output}=\text{Orig}(1-\text{Lum\_}F_{(x,y)})+(\text{Filtered col}\times\text{Lum\_}F_{(x,y)}) \quad (8)$$

As the input data also drops below the chroma threshold, the colored data from stage 1, Stage 1 Output, is replaced by luminance data, luma, to give the final output.

$$\text{Final output}=(\text{Stage1 Output})(1-\text{Chrom\_}F_{(x,y)})+(\text{luma}\times\text{Chrom\_}F_{(x,y)}) \quad (9)$$

Equations 8 and 9 are the results of the decision making algorithms used. This is a preferred embodiment of the invention. It is possible to use only equation 9, using only the chrominance threshold. In this case the stage 1 output used in equation 9 would be the original data, Orig.

Figure 2:
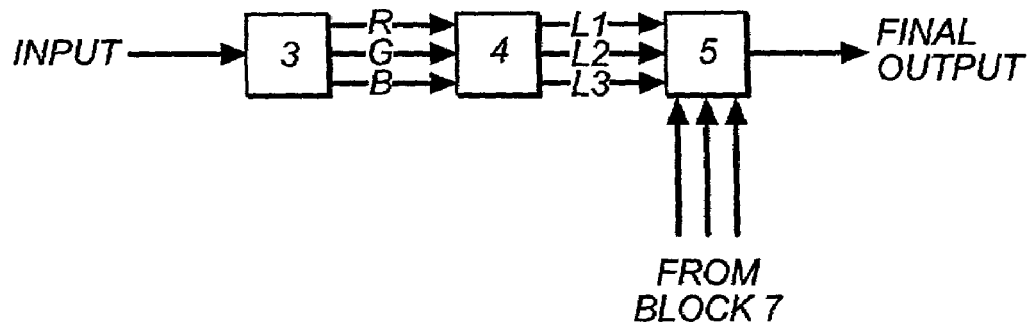
FIG. 2 is a block diagram showing preferred processing steps of the method.

FIG. 2 illustrates the processing steps of a preferred embodiment of the invention.

Box 3 formats the image data, if required, into red, green and blue channels. The red, green and blue channels are output from box 3. These are fed into box 4.

Three outputs, L1, L2 and L3, are obtained from box 4. L1, the original data fed into the box, L2, a filtered version of the original data, and L3, low pass filtered luminance data. Outputs L1, L2 and L3 are fed into box 5. Outputs L2 and L3 are also fed into box 6 of FIG. 3 as described later.

Figure 3:
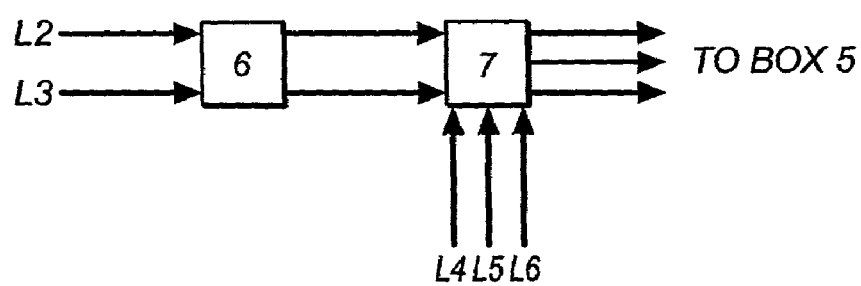
FIG. 3 is a block diagram showing preferred decision making steps of the method.

Box 5 sums the proportions of the different versions of input data, as defined by L1, L2 and L3, as calculated by the decision making algorithm illustrated in FIG. 3. The output from box 5 is the final image where a proportion of the original data has been substituted by the processed data to give an output image in which the noise levels in the shadows of the original image have been reduced.

FIG. 3 illustrates the decision making algorithm of the method of the invention.

In the preferred embodiment illustrated L2 and L3, as defined above, are fed into box 6. However, it is possible to use the original red, green and blue channels from the original image. In the preferred embodiment box 6 calculates the luminance mean level and the chroma level as described above. These values are output from box 6 and are fed into box 7. Also fed into box 7 are L4, the luminance threshold, luma threshold$_{in}$, L5, the chroma threshold, chroma threshold$_{in}$, and L6, the onset value. These thresholds are user set thresholds as described earlier.

The input thresholds can be any value between 0 and 1 and the Luma mean can be any value between the minimum and maximum digital value of the input data. Typically the values for luma threshold$_{in}$ and chroma threshold$_{in}$ would be 0.5 and 0.25 of the normalized luma mean.

Box 7 provides three factors which determine the proportion of the original data and processed data used for the final output image in equations 8 and 9. These three factors are input into box 5 and provide the final output image.

In the interests of clarity only one channel is shown in the drawings. However it will be appreciated that the output select and addition process is repeated for all channels, red, green and blue (RGB).

The above process is repeated pixel by pixel to build up an image in which color and noise in shadows has been reduced.

The present invention will normally be used with digital images in which red, green and blue channels are used for the production of a complete color picture. However the invention is not limited to such image files. Images having yellow, magenta, cyan and black channels can be used.

The invention has been described in detail with reference to preferred embodiments thereof. It will be understood by those skilled in the art that variations and modifications can be effected within the scope of the invention.

What is claimed is:

1. A method of manipulating color images in areas of shadow comprising the steps of
   generating a luminance version of the original color input data,
   determining a mean value of the input data,
   determining a chroma level,
   calculating an adaptive chrominance threshold, from a predetermined chrominance input threshold and the determined mean value, and
   replacing, in an output image, a proportion of the input data with the luminance version of the data, the proportion of the input data being replaced being determined from the adaptive chrominance threshold and the chroma level.

2. A method as claimed in claim 1 wherein the mean value determined is the luminance mean value.

3. A method as claimed in claim 1 wherein the luminance version of the data is low pass filtered.

4. A method as claimed in claim 3 wherein the original color input data of claim 1 is pre-processed by replacing a proportion of the original color input data with filtered color input data, the proportion of the original color input data being replaced being determined by a predetermined luminance input threshold, the pre-processed data forming the input data of claim 1.

5. A method as claimed in claim 4 wherein the proportion of original color input data replaced is determined by an adaptive luminance threshold calculated from the predetermined luminance input threshold and the determined mean value.

6. A method as claimed in claim 1 wherein the chroma level is determined by adding the absolute differences between each color channel and the luminance.

7. A method as claimed in claim 6 wherein the luminance is equally weighted between the three color channels.

8. A method as claimed in claim 1 wherein the adaptive thresholds are calculated by multiplying the determined mean value with the predetermined input thresholds.

9. A method as claimed in claim 1 herein an onset parameter determines the rate of replacement of data.

* * * * *